July 1, 1958
D. SPINOSA
2,840,978
GRASS RAKE AND GRAPPLE
Filed Oct. 31, 1956
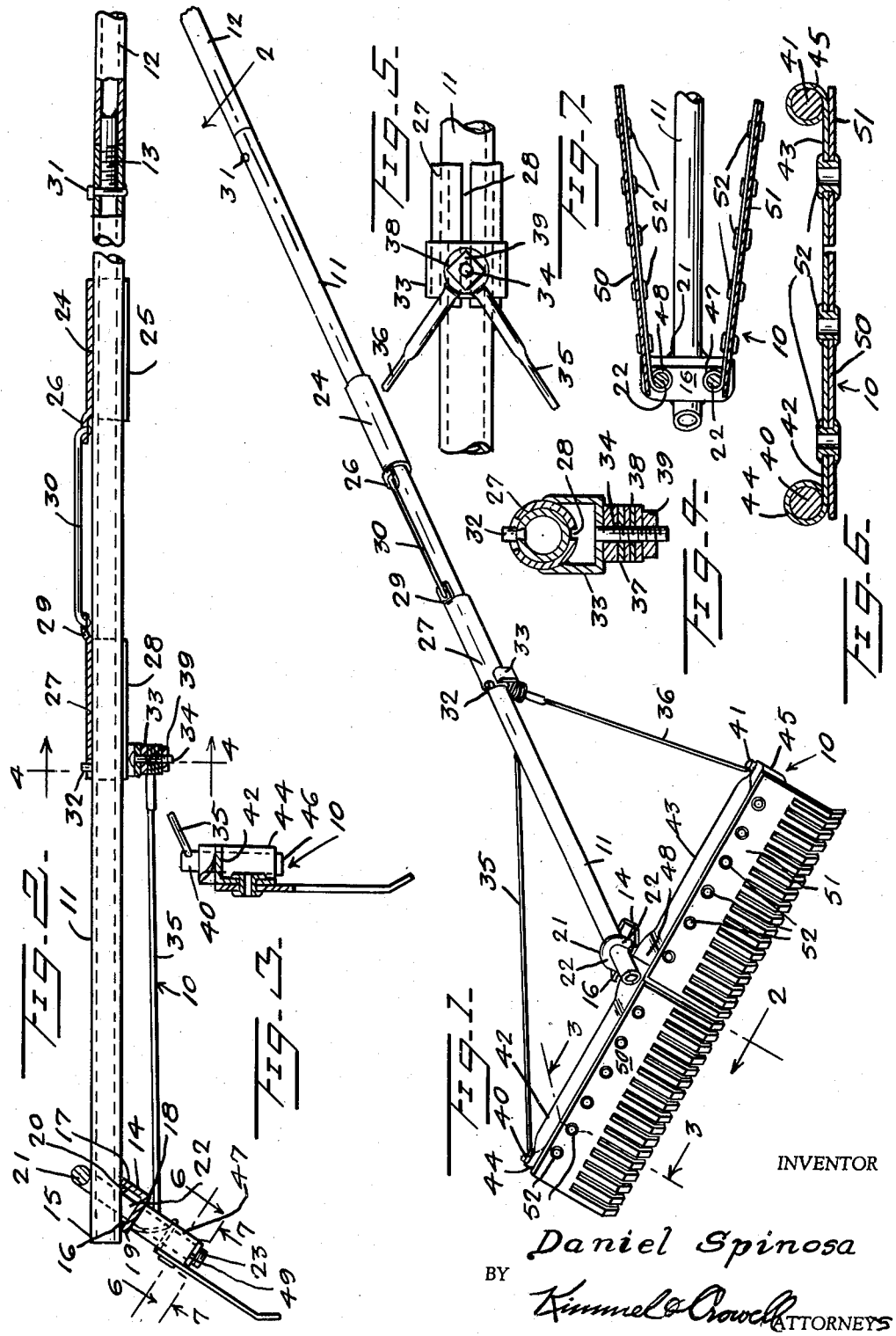
INVENTOR
Daniel Spinosa
BY
Kimmel & Crowell
ATTORNEYS

United States Patent Office 2,840,978
Patented July 1, 1958

2,840,978

GRASS RAKE AND GRAPPLE

Daniel Spinosa, Somerville, Mass.

Application October 31, 1956, Serial No. 619,623

5 Claims. (Cl. 56—400.04)

The present invention relates to grass rakes and grapples, and more particularly to such devices which can both gather, cut material by a rake action, and then grasp the gathered material for handling same as desired.

The primary object of the invention is to provide an efficient grass and leaf rake having means associated therewith for moving the rake teeth into a grappling position.

Another object of the invention is to provide a rake of the class described above in which the rake teeth are detachably secured to the rake.

A further object of the invention is to provide a rake and grapple of the class described above which is inexpensive to manufacture, simple to use, and durable in hard service.

Other objects and advantages will become apparent in the following specification when considered in the light of the attached drawings, in which:

Figure 1 is a perspective view of the invention shown partly broken away for convenience of illustration.

Figure 2 is an enlarged longitudinal cross-section taken along the line 2—2 of Figure 1, looking in the direction of the arrows, with parts broken away for convenience of illustration.

Figure 3 is an enlarged vertical cross-section taken along the line 3—3 of Figure 1, looking in the direction of the arrows.

Figure 4 is an enlarged vertical cross-section taken along the line 4—4 of Figure 2, looking in the direction of the arrows.

Figure 5 is an enlarged fragmentary plan view of the linkage connection.

Figure 6 is an enlarged fragmentary horizontal cross-section taken along the line 6—6 of Figure 2, looking in the direction of the arrows.

Figure 7 is an enlarged fragmentary transverse cross-section taken along the line 7—7 of Figure 2, looking in the direction of the arrows with the rake teeth in folded position.

Referring now to the drawings in detail wherein like reference characters indicate like parts throughout the several figures, the reference numeral 10 indicates generally a combined rake and grapple constructed in accordance with the invention.

The combined rake and grapple 10 includes a handle 11 formed of tubular material, a handle extension 12, similarly formed of tubular material and detachably connected to the handle 11 by a threaded connector 13. The handle 11 and the handle extension 12 are arranged in axially aligned abutting relation.

A bracket 14 is secured to the lower end 15 of the handle 11 by welding or other suitable means. The bracket 14 is provided with a flat base portion 16 and a flat upstanding portion 17 integrally formed with the base portion 16 and extending perpendicularly thereto. The base portion 16 and the upstanding portion 17 constituting the legs of the bracket 14 form an angle at 18, as best seen in Figure 2.

The edge 19 of the base portion 16 opposite the angle 18 and the edge 20 of the upstanding portion 17 opposite the angle 18 are each welded to the handle 11 so that both the base 16 and the upstanding portion 17 are arranged at an angle to the axis of the handle 11.

A U pivot bolt 21 is arranged with its flexed portion in overlying relation to the handle 11 and has the spaced parallel legs 22 thereof arranged in piercing relation with respect to the base 16 of the bracket 14 so that the threaded end portions 23 thereof extend substantially below the base portion 16. U bolt 21 is arranged perpendicularly to the base 16 so that the threaded end portions 23 thereof project forwardly at an angle to the handle 11.

A tubular slider 24 is mounted on the handle 11 and is provided with a longitudinal slot 25 extending from one end to the other thereof, as illustrated in Figure 2. The slider 24 is provided with a longitudinally extending tongue 26, as seen in Figure 1, for reasons to be assigned. A second tubular slider 27 is arranged on the handle 11 between the U bolt 21 and the slider 24 and is similarly slotted at 28 from one end to the other thereof, for reasons to be assigned.

The slider 27 is likewise provided with a longitudinally extending tongue 29, and the tongues 26 and 29 are arranged on the sliders 24 and 27, respectively, so as to be on the adjacent sides.

An elongated rod 30 has its opposite ends riveted in the tongues 26 and 29, respectively, connecting the sliders 24 and 27 for reciprocal movement on the handle 11. A stop pin 31 extends through the handle 11 adjacent the outer end thereof limiting the outer movement of the slider 24, and a second stop pin 32 extends through the handle 11 adjacent to but spaced from the inner end of the handle 11 to limit the inward movement of the slider 27.

A U-shaped bracket 33 is welded to the slider 27 in underlying relation thereto, as best seen in Figures 2, 4 and 5. A bolt 34 is mounted in the bracket 33 and extends outwardly therefrom. A pair of identical arms 35 and 36 are provided with flattened end portions 37 and 38, respectively, which are pivotally secured to the bolt 34 by means of a nut 39. The opposite ends of the links 35 and 36 have fixedly secured thereto and extending at an angle therefrom pivot pins 40 and 41 the purpose of which will be described.

Angle iron rake arms 42 and 43 are provided at their outer ends by sockets 44 and 45, respectively, which are adapted to engage about the pivot pins 40 and 41, respectively, and be secured thereon by riveting as at 46. The inner ends of the rake arms 42 and 43 are provided with pivot sockets 47 and 48, respectively, which are adapted to engage over the threaded end portions 23 of the U bolt 21, as best seen in Figure 2. The sockets 47 and 48 are retained on the U bolt 21 by means of nuts 49. Grass rake tooth plates 50 and 51 are secured to the rake arms 42 and 43 by means of tubular rivets 52.

In the use and operation of the invention, as disclosed in Figures 1 through 7, for normal raking operations, the sliders 24 and 27 are maintained in engagement with the stop 32 so that the teeth plates 50 and 51 are aligned perpendicularly to the handle 11, as shown in Figure 1. After the grass, leaves, and/or other debris has been raked into the pile, the teeth plates 50 and 51 can be hinged on the U bolt 21 bringing them into facing relation, as shown in Figure 7, to grasp the material of the pile therebetween.

To effect the closing action of the raking elements or teeth plates 50 and 51, the sliders 24 and 27 are moved axially on the handle 11 away from the U bolt 21 so that the links 35 and 36 will pull the rake bars 42 and 43 rearwardly in a pivotal movement.

Obviously, by reversing the position of the sliders 24 and 27, the rake bars 42 and 43 will be returned to their raking position, as illustrated in Figure 1.

Having thus described the preferred embodiment of the invention, it should be understood that numerous structural modifications and adaptations may be resorted to without departing from the scope of the appended claims.

What is claimed is:

1. A combination rake and grapple comprising an elongated handle, a pair of diametrically opposed aligned rake elements, means pivotally securing said rake elements at their adjacent ends to one end of said handle, said pivot means lying in a plane forming an obtuse angle with respect to the longitudinal axis of said handle, slider means slidably disposed on said handle and movable relative to said handle, and means interconnecting said slider means and said rake elements at their respective ends remote from said adjacent ends, whereby movement of said slider means away from said one end of said handle pivots said rake elements inwardly toward said handle axis at an angle thereto for grasping of material.

2. A device as claimed in claim 1 wherein said handle is provided with upper and lower limit stops for said slider means.

3. A combined rake and grapple comprising an elongated handle, bracket means including a pair of leg members fixedly secured to one end of said handle, a substantially U-shaped pivot bolt carried by one of said leg members and encompassing a portion of the peripheral surface of said handle, said pivot bolt lying in a plane forming an obtuse angle with respect to the longitudinal axis of said handle, a pair of oppositely disposed aligned rake elements pivotally secured to said pivot bolt and extending transversely of said handle, and means extending between the opposite ends of said rake elements and said handle whereby said rake elements can be pivoted together in a grasping action, said rake elements extending at an angle to said handle when pivoted together.

4. A device as claimed in claim 3, wherein the means extending between the opposite ends of said rake elements and said handle comprises a slider on said handle and links pivotally secured at one end to said opposite ends, respectively, of said rake elements and at their other ends pivotally secured to said slider.

5. A combination rake and grapple comprising an elongated handle having a forward and gripping portion, respectively, bracket means including a pair of leg members fixedly secured to said forward portion of said handle, pivot means including a flexed portion and carried by one of said leg members, said pivot meanus lying in a plane forming an obtuse angle with respect to the longitudinal axis of said handle, said flexed portion of said pivot means being disposed circumjacent said handle, a pair of diametrically opposed aligned rake elements pivotally secured to said pivot means and extending outwardly with respect to said forward portion of said handle, slider means slidably disposed on said handle and movable relative to said handle, and link means interconnecting said slider means and said rake elements at their opposite ends remote from said pivot means, whereby movement of said slider means toward said gripping portion of said handle pivots said rake elements inwardly toward said handle at an angle thereto to permit grasping of material.

References Cited in the file of this patent

UNITED STATES PATENTS 2,086,170     Muranaka  ---------------- July 6, 1937